United States Patent
Kruckemyer et al.

(10) Patent No.: US 10,133,671 B2
(45) Date of Patent: Nov. 20, 2018

(54) PROXY CACHE CONDITIONAL ALLOCATION

(71) Applicants: David A Kruckemyer, San Jose, CA (US); Craig Stephen Forrest, San Francisco, CA (US)

(72) Inventors: David A Kruckemyer, San Jose, CA (US); Craig Stephen Forrest, San Francisco, CA (US)

(73) Assignee: ARTERIS, Inc., Campbell, CA (US)

( * ) Notice: Subject to any disclaimer, the term of this patent is extended or adjusted under 35 U.S.C. 154(b) by 0 days.

(21) Appl. No.: 15/396,416

(22) Filed: Dec. 30, 2016

(65) Prior Publication Data

US 2017/0192890 A1 Jul. 6, 2017

Related U.S. Application Data

(60) Provisional application No. 62/273,784, filed on Dec. 31, 2015.

(51) Int. Cl.
| | | |
|---|---|---|
| *G06F 12/08* | (2016.01) | |
| *G06F 12/0815* | (2016.01) | |
| *G06F 12/0804* | (2016.01) | |
| *G06F 13/40* | (2006.01) | |

(52) U.S. Cl.
CPC ...... *G06F 12/0815* (2013.01); *G06F 12/0804* (2013.01); *G06F 13/4027* (2013.01); *G06F 2212/1008* (2013.01); *G06F 2212/60* (2013.01); *G06F 2212/621* (2013.01)

(58) Field of Classification Search
CPC ............ G06F 12/0804; G06F 12/0815; G06F 13/4027
USPC .......................................................... 711/141
See application file for complete search history.

(56) References Cited

U.S. PATENT DOCUMENTS

| | | | | |
|---|---|---|---|---|
| 6,557,048 B1 * | 4/2003 | Keller | ................. | G06F 13/4059 710/58 |
| 6,714,994 B1 * | 3/2004 | Keller | ................. | G06F 13/1621 710/33 |
| 6,721,813 B2 * | 4/2004 | Owen | ................. | G06F 13/4243 710/107 |
| 6,745,272 B2 * | 6/2004 | Owen | ................... | H04L 1/1671 710/107 |
| 7,047,372 B2 * | 5/2006 | Zeitler | ................ | G06F 12/0815 710/260 |
| 7,069,361 B2 * | 6/2006 | Owen | ................... | H04L 1/1671 710/107 |
| 8,862,801 B2 * | 10/2014 | Saripalli | ............. | G06F 9/30087 710/100 |
| 2002/0103948 A1 * | 8/2002 | Owen | ................. | G06F 13/4243 710/33 |
| 2004/0210693 A1 * | 10/2004 | Zeitler | ................ | G06F 12/0815 710/100 |

(Continued)

*Primary Examiner* — Than Nguyen

(57) ABSTRACT

A system and method are disclosed that include a bridge that translates non-coherent transactions, which are received from a non-coherent subsystem, into one or more coherent transactions to be issued to a coherent subsystem. The bridge also buffers data coherently in an internal cache, also known as a proxy cache, based on certain attributes of the non-coherent transaction. The invention may be applied to any cache, which receives read and write transactions that become coherent transactions.

15 Claims, 2 Drawing Sheets

(56) References Cited

U.S. PATENT DOCUMENTS

| | | | |
|---|---|---|---|
| 2015/0032924 A1* | 1/2015 | Saripalli | G06F 9/30087 |
| | | | 710/106 |
| 2016/0188472 A1* | 6/2016 | Forrest | G06F 12/0817 |
| | | | 711/146 |
| 2017/0255558 A1* | 9/2017 | Forrest | G06F 12/0831 |

* cited by examiner

PROXY CACHE CONDITIONAL ALLOCATION

CROSS-REFERENCE TO RELATED APPLICATION

The present invention claims the benefit of U.S. Provisional Application Ser. No. 62/273,784 titled PROXY CACHE CONDITIONAL ALLOCATION filed on Dec. 31, 2015 by David KRUCKEMYER, the entire disclosure of which is incorporated in its entirety by reference

FIELD OF THE INVENTION

The invention is directed to computer systems and, more specifically, to translation from non-coherent transaction to coherent transactions.

BACKGROUND

Hardware systems and semiconductor intellectual properties (IP) may need to exchange information between non-coherent and coherent systems. They also logically operate on addresses at multiple points to distinguish between memory regions. In a coherent system, non-coherent transactions received from a non-coherent subsystem need to be translated into one or more coherent transactions that are subsequently issued to a coherent subsystem. Therefore, what is needed is a system and method to translate non-coherent transactions, which are received from a non-coherent subsystem, into one or more coherent transactions issued to a coherent subsystem.

SUMMARY OF THE INVENTION

The preferred embodiment is a bridge that translates non-coherent transactions, which are received from a non-coherent subsystem, into one or more coherent transactions to be issued to a coherent subsystem. The bridge also buffers data coherently in an internal cache, known as a proxy cache, based on certain attributes of the non-coherent transaction. The invention may be applied, however, to any cache that receives read and write transactions that become coherent transactions.

BRIEF DESCRIPTION OF THE DRAWINGS

The invention is described in accordance with the aspects and embodiments in the following description with reference to the figures, in which like numbers represent the same or similar elements, as follows.

DETAILED DESCRIPTION

Figure 1:
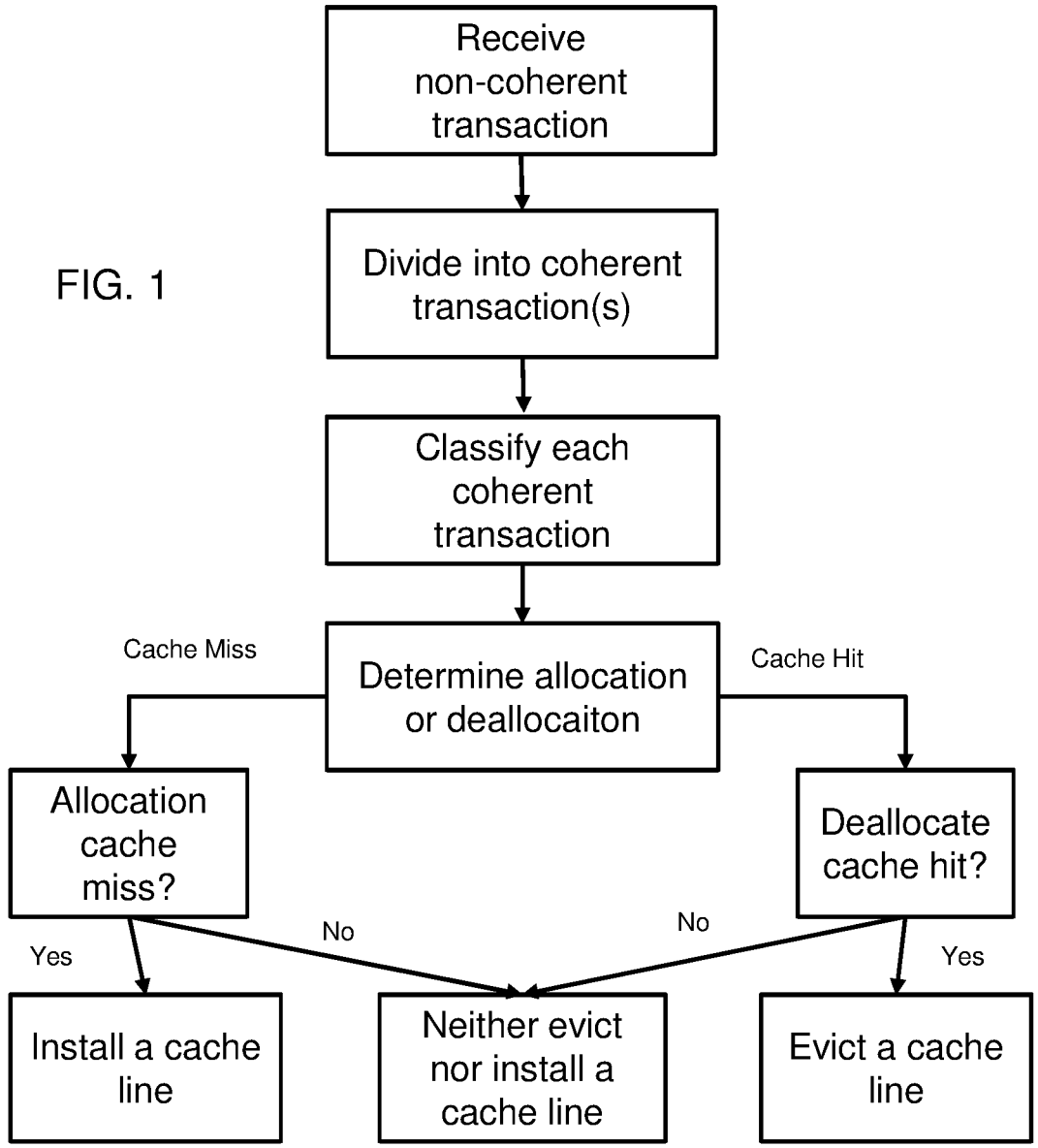
FIG. 1 illustrates a process for receiving non-coherent transactions in accordance with various aspects of the invention.
Figure 2:
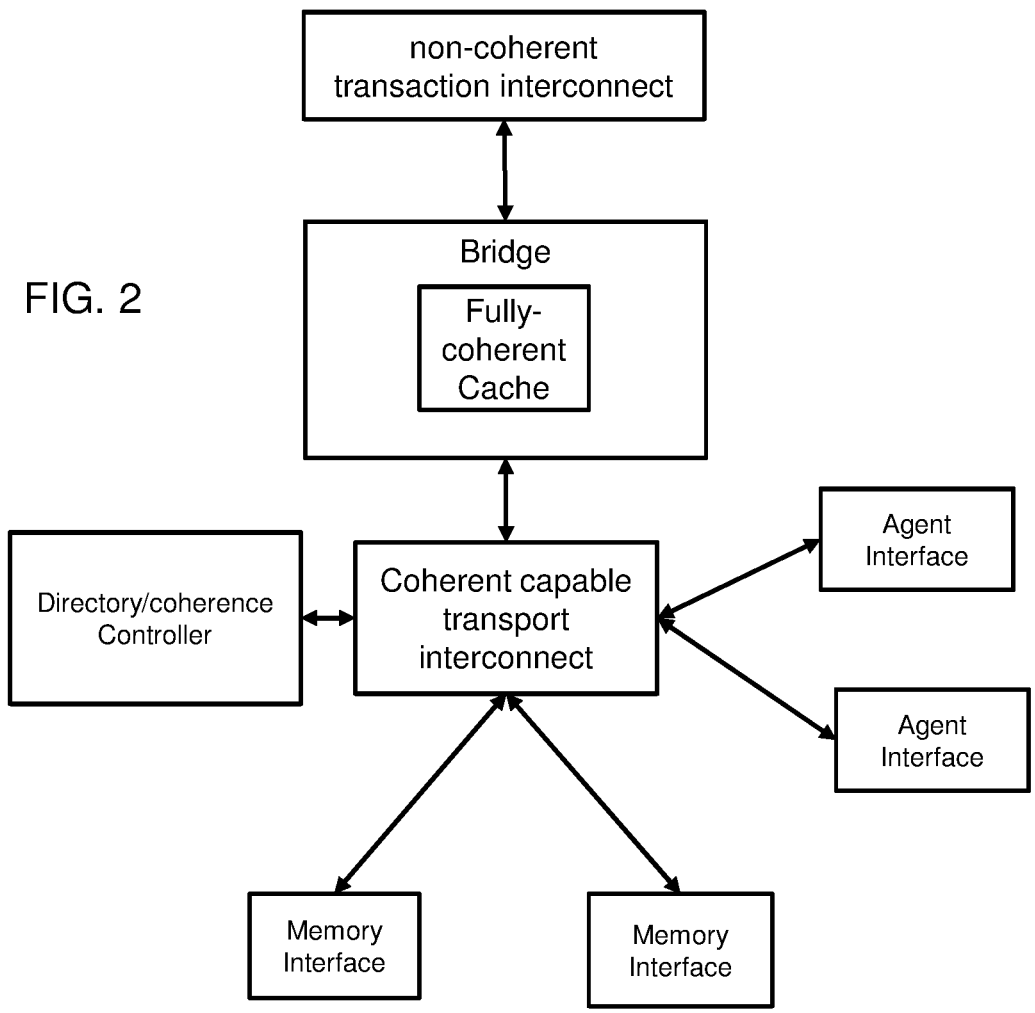
FIG. 2 illustrates a system including a transport interconnect and a bridge in accordance with the various aspects of the invention.

Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

In accordance with various aspects and embodiment of the invention a distributed system implementation for cache coherence includes distinct agent interface units, coherency controllers, and memory interface units. The agents send requests in the form of read and write transactions. The system also includes a memory. The memory includes coherent memory regions. The memory is in communication with the agents. The system includes a coherent interconnect in communication with the memory and the agents. The system includes a second coherent interconnect in communication with the memory and the agents. The system also includes a comparator for comparing at least two inputs, the comparator is in communication with the two coherent interconnects. The features of the system are outlined and discussed below.

A cache coherence system performs at least three essential functions:

1. Interfacing to coherent agents—This function includes accepting transaction requests on behalf of a coherent agent and presenting zero, one, or more transaction responses to the coherent agent, as required. In addition, this function presents snoop requests, which operate on the coherent agent's caches to enforce coherence, and accepts snoop responses, which signal the result of the snoop requests.
2. Enforcing coherence—This function includes serializing transaction requests from coherent agents and sending snoop requests to a set of agents to perform coherence operations on copies of data in the agent caches. The set of agents may include any or all coherent agents and may be determined by a directory or snoop filter (or some other filtering function) to minimize the system bandwidth required to perform the coherence operations. This function also includes receiving snoop responses from coherent agents and providing the individual snoop responses or a summary of the snoop responses to a coherent agent as part of a transaction response.
3. Interfacing to the next level of the memory hierarchy—This function includes issuing read and write requests to a memory, such as a DRAM controller or a next-level cache, among other activities.

Performing these functions in a single unit has the benefit of keeping the logic for these related functions close together, but has several major drawbacks. The single unit will be large, and therefore will use a significant amount of silicon area. That will cause congestion in routing of wires around the unit. A single unit will also tend to favor having a single memory or, if multiple memories are used, having them close together to avoid having excessively long wires between the single coherence unit and the memories. Multiple memories, which are typically implemented with interleaved address ranges, are increasingly prevalent.

The transport interconnect that couples the units is a means of communication that transfers at least all semantic information necessary, between units, to implement coherence. The transport interconnect, in accordance with some aspects and some embodiments of the invention, is a network-on-chip, though other known means for coupling interfaces on a chip can be used and the scope of the invention is not limited thereby. The transport interconnect provides a separation of the interfaces between the agent interface unit (AIU), coherence controller, and memory interface units such that they may be physically separated.

The transport interconnect is a component of a system that provides standardized interfaces to other components and functions to receive transaction requests from initiator components, issue a number (zero or more) of consequent requests to target components, receive corresponding responses from target components, and issue responses to initiator components in correspondence to their requests. The transport interconnect, according to some embodiments of the invention, is packet-based. It supports both read and write requests and issues a response to every request. In other embodiments, the transport interconnect is message-based. Some or all requests cause no response. In some embodiments, multi-party transactions are used such that initiating agent requests go to a coherence controller, which in turn forwards requests to other caching agents, and in some cases a memory, and the agents or memory send responses directly to the initiating requestor. In some embodiments, the transport interconnect supports multicast requests such that a coherence controller can, as a single request, address some or all of the agents and memory. According to some embodiments the transport interconnect is dedicated to coherence-related communication and in other embodiments at least some parts of the transport interconnect are used to communicate non-coherent traffic. In some embodiments, the transport interconnect is a network-on-chip with a grid-based mesh or depleted-mesh type of topology. In other embodiments, a network-on-chip has a topology of switches of varied sizes. In some embodiments, the transport interconnect is a crossbar. In some embodiments, a network-on-chip uses virtual channels.

The invention requires logic that divides non-coherent transactions into individual coherent transactions that each accesses a cache line; each of these coherent transactions represents a "part" of the original non-coherent transaction.

The logic also classifies each coherent part based on the following characteristics:
  Read vs. Write (i.e. the original non-coherent transaction type);
  Full cache line (i.e. all bytes accessed) vs. Partial cache line (i.e. some bytes accessed);
  Cache hit (i.e. data present in the cache) vs. Cache miss (i.e. data not present in the cache); and
  First part vs. Middle part vs. Last part (i.e. the relative temporal or address order that the parts are accessed).

Combinations of these characteristics determine the "type" of each part. For example, one type consists of reads of a full cache line that miss in the cache. This type may consist of more specific types, e.g. this type may be further classified as a first part, a middle part, or a last part.

A software programmable register may be implemented to enable or disable the allocation of each of the types dynamically, i.e. a bit in the register enables or disables the allocation of a part based on its particular type. In addition, a second software programmable register may be implemented to enable or disable the deallocation of each of the types dynamically. Alternatively, the allocation and deallocation policies may be statically defined when the design is specified.

In short, a bridge that implements a cache receives and divides non-coherent transactions into one or more coherent transactions. Each coherent transaction is classified into a type, and the allocation and deallocation policy, whether dynamically programmed or statically defined, determines whether the cache line accessed by the coherent transaction is allocated into the cache or deallocated from the cache at the completion of the coherent transaction.

A bridge with a fully-coherent cache connects to a non-coherent transport interconnect (NCTI) and receives non-coherent transactions from the NCTI. These transactions may be either reads or writes and may have any starting address alignment and length. The bridge also connects to a coherent-capable transport interconnect (CCTI) on which the bridge may issue coherent transactions that access a cache line, whose size equals the size of the granule on which coherence is maintained by the directory (or coherence controller). Note that in some systems the size of the cache line in the directory may be different from the size of the cache line in the fully-coherent cache.

Based on the division of the non-coherent transaction into one or more coherent transactions, the bridge classifies each coherent transaction based on the following:
  The original non-coherent transaction type (i.e. read or write)
  The number of bytes accessed by the coherent transaction (i.e. full cache line or partial cache line)
  Whether the fully-coherent cache access results in a hit or a miss
  The relative order of the coherent transaction with respect to other coherent transactions from the same non-coherent transaction (i.e. the given coherent transaction is at the beginning, in the middle, or at the end)

Based on this classification, the bridge determines what to do with the copy of data at the completion of the coherent transaction based on an allocation policy. The allocation policy may be determined at the time of specifying the design, or the allocation policy may be determined based on the state of a control register implemented in the bridge and programmed by software. Additional allocation policy heuristics may be applied.

Based on the classification and allocation policy, at the end of the coherent transaction, the cache line may be installed in the cache, may be left alone (i.e. an allocated cache line stays allocated or a deallocated cache line stays deallocated), or may be evicted from the cache.

Typically, caches are implemented in processors, and processor cache allocation policies are based on either page table descriptions, which provides allocation information on large blocks of memory, or instruction encodings, which provide allocation information on a fine-grained basis. Processor accesses to the cache are typically small in size, i.e. from 1 to 8 bytes, and there is not much information that the cache can determine about the overall workload from a single access.

Accesses to a bridge, however, are typically either small, and may be sequential or random in nature, or large, and may cover multiple sequential cache lines. Generally speaking, the workload that accesses a fully-coherent cache in a bridge is understood at design specification time, and the allocation policy may be tailored to use the cache resources more efficiently.

For example, a common workload is a bulk data transfer, where data is pulled by an agent in a non-coherent subsystem from a coherent subsystem or pushed by that agent into a coherent subsystem. In this case, the agent is making large sequential accesses, possibly unaligned. For this type of workload, caching the result of the last partial coherent transaction is useful since that represents the boundary between non-coherent transactions, and the first part of a second non-coherent transaction in a pair can hit on the allocated last part of the first non-coherent transaction. Further, caching the results of the middle parts of a non-coherent transaction wastes cache resources since that data will not be reused. Allocating these middle parts also results in additional bandwidth as the allocations may require evictions to free up space in the cache. This efficiency may not be realized with a standard processor-type cache.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Where a range of values is provided, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

To the extent that the terms "including", "includes", "having", "has", "with", or variants thereof are used in either the detailed description and the claims, such terms are intended to be inclusive in a similar manner to the term "comprising". Therefore, the scope of the invention, therefore, is not intended to be limited to the various aspects and embodiments discussed and described herein. Rather, the scope and spirit of invention is embodied by the appended claims.

What is claimed is:

1. A system comprising:
   a non-coherent transport interconnect (NCTI);
   a coherent-capable transport interconnect (CCTI); and
   a bridge including a coherent cache, the bridge communicates with the NCTI and the CCTI,
   wherein the bridge generates a first plurality of coherent transactions by dividing a first non-coherent transaction, which is received from the NCTI,
   wherein the bridge classifies each coherent transaction using an allocation policy, and
   wherein, at the end of each coherent transaction of the first plurality of coherent transactions, the bridge manages a copy of data that results from each coherent transaction by caching a result of a last coherent transaction that represents the boundary between the first non-coherent transaction and a second non-coherent transaction.

2. The system of claim 1 wherein the first non-coherent transaction received from the NCTI is classified using the allocation policy.

3. The system of claim 1 wherein the second non-coherent transaction is divided into a second plurality of coherent transactions, such that the first part of the second non-coherent transaction hits on an allocated last part of the first non-coherent transaction.

4. The system of claim 1 wherein the first plurality of coherent transactions includes a middle coherent transaction.

5. The system of claim 4 wherein the bridge drops data resulting from a transaction for a middle coherent transaction associated with the first non-coherent transaction to save the coherent cache resources of the bridge.

6. The system of claim 1 wherein the bridge allocated cache resources based on the number of bytes of the on bridge's coherent cache that each coherent transaction accesses.

7. The system of claim 1 wherein the bridge classifies at least one of the plurality of coherent transaction based on access to cache lines being a hit.

8. The system of claim 1 wherein the bridge classifies at least one of the plurality of coherent transaction based on access to cache lines being a miss.

9. The system of claim 1 wherein the bridge issues coherent transactions on the CCTI.

10. The system of claim 1 wherein the bridge classifies at least one of the plurality of coherent transaction as a read transaction.

11. The system of claim 1 wherein the bridge classifies at least one of the plurality of coherent transaction as a write transaction.

12. The system of claim 1 wherein the bridge uses a deallocation policy to determine if a cache line, which was accessed by a coherent transaction selected from the first plurality of coherent transactions, is deallocated from the directory's coherent cache at the completion of the coherent transaction.

13. A method of generating a plurality of first coherent transactions based on a first non-coherent transaction using a bridge in communication with a non-coherent transport interconnect (NCTI) and a coherent-capable transport interconnect (CCTI), the method comprising:
   receiving the first non-coherent transaction from the NCTI;
   dividing the first non-coherent transaction received from the NCTI;
   generating a first plurality of coherent transactions using the divided first non-coherent transaction,
   classifying each coherent transaction of the first plurality of coherent transactions based on an allocation policy,
   managing a copy of data that results from each coherent transaction of the first plurality of coherent transactions; and
   caching a result of a last coherent transaction that represents the boundary between the first non-coherent transaction and a second non-coherent transaction.

14. The method of claim 13 further comprising the set of dropping data resulting from a transaction for a middle coherent transaction associated with the first non-coherent transaction to save the coherent cache resources of the bridge.

15. At least one non-transitory computer readable medium storing code, which when executed by at least one computer, would cause the computer to:
   divide a first non-coherent transaction received from a non-coherent transport interconnect;
   generate a first plurality of coherent transactions using the divided first non-coherent transaction,
   classify each coherent transaction of the first plurality of coherent transactions based on an allocation policy,
   manage a copy of data that results from each coherent transaction of the first plurality of coherent transactions; and
   cache a copy of data that results of a last coherent transaction that represents the boundary between the first non-coherent transaction and a second non-coherent transaction.

* * * * *